United States Patent [19]
Sakashita

[11] Patent Number: 6,032,246
[45] Date of Patent: Feb. 29, 2000

[54] BIT-SLICE PROCESSING UNIT HAVING M CPU'S READING AN N-BIT WIDTH DATA ELEMENT STORED BIT-SLICED ACROSS M MEMORIES

[75] Inventor: Kazuhiro Sakashita, Tokyo, Japan

[73] Assignee: Mitsubishi Denki Kabushiki Kaisha, Tokyo, Japan

[21] Appl. No.: 09/045,863

[22] Filed: Mar. 23, 1998

[30] Foreign Application Priority Data

Sep. 19, 1997 [JP] Japan ..................................... 9-255173

[51] Int. Cl.⁷ ........................................................ G06F 9/00
[52] U.S. Cl. .............................................. 712/33; 712/200
[58] Field of Search ................................ 712/33, 200, 32, 712/36; 708/518

[56] References Cited

U.S. PATENT DOCUMENTS

| | | | |
|---|---|---|---|
| 4,393,468 | 7/1983 | New ........................................ | 708/518 |
| 4,418,383 | 11/1983 | Doyle et al. ............................ | 708/190 |
| 4,760,517 | 7/1988 | Miller et al. ............................ | 712/42 |
| 5,832,294 | 11/1998 | Reinschmidt ........................... | 712/32 |
| 5,903,772 | 5/1999 | White et al. ............................ | 712/33 |
| 5,911,082 | 6/1999 | Monroe et al. ......................... | 712/32 |
| 5,918,065 | 6/1999 | Ando ....................................... | 712/42 |
| 5,931,941 | 8/1999 | Worrell ................................... | 712/210 |

FOREIGN PATENT DOCUMENTS

| | | |
|---|---|---|
| 61-11873 | 1/1986 | Japan . |
| 63-261445 | 10/1988 | Japan . |

OTHER PUBLICATIONS

IBM, Signal Processor Hardware Architecture for Optimum Instruction Efficiency, IBM Technical Disclosure Bulletin, vol. 31, No. 12, pp. 390–391, May 1989.

IBM, Bit Slice Array Macro Concepts for Embedded Arrays, IBM Technical Disclosure, Bulletin, vol. 30, No. 3, pp. 1164–1165, Aug. 1987.

Kotani, Seigo et al., A Subnanosecond Clock Josephson 4–bit Processor, IEEE Journal of Solid–State Circuits, vol. 25, No. 1, pp. 117–124, Feb. 1990.

Gauthier, Robert V. et al., A 150–MOPS GaAs 8–bit Slice Processor, IEEE Journal of Solid–State Circuits, vol. 23, No. 5, pp. 1195–1201, Oct., 1988.

*Primary Examiner*—Richard L. Ellis
*Attorney, Agent, or Firm*—Burns, Doane, Swecker & Mathis, LLP

[57] ABSTRACT

An object is to compatibly improve processing speed and storage capacity of semiconductor memory that the operation portion can use. Each of units (10a, 10b) each having an operation portion (11) and a memory portion (12) is formed of a single semiconductor chip. A data signal is separately stored in the two memory portions (12) in a bit-sliced form and each of the two operation portions (11) can use the 32-bit-wide data signal stored in the entirety of the two memory portions (12) through interconnections (22, 23). That is to say, each operation portion (11) can use a storage capacity twice larger than the capacity that can be ensured in a single semiconductor chip. Provided as interconnections for coupling the semiconductor chips are only the interconnections (22, 23) for transferring data signals from the two memory portions to the two operation portions (11). Hence, the bit width of the interconnections (22, 23) can be increased to increase the transmission speed of the data signals and to increase the processing speed of the device.

13 Claims, 10 Drawing Sheets

$$L1 + L2 + \cdots + L4 = 32$$
$$L1 \times W1 = L2 \times W2 = \cdots = L4 \times W4$$

FIG. 12

$$L1 + L2 + \cdots + L4 = 32$$
$$L1 = L2 = \cdots = L4$$
$$W1 = W2 = \cdots = W4$$

BIT-SLICE PROCESSING UNIT HAVING M CPU'S READING AN N-BIT WIDTH DATA ELEMENT STORED BIT-SLICED ACROSS M MEMORIES

BACKGROUND OF THE INVENTION

1. Field of the Invention

The present invention relates to data processing devices, and particularly to improvement for increasing processing speed and ensuring storage capacity required for semiconductor memory in a compatible way.

2. Description of the Background Art.

Figure 13:
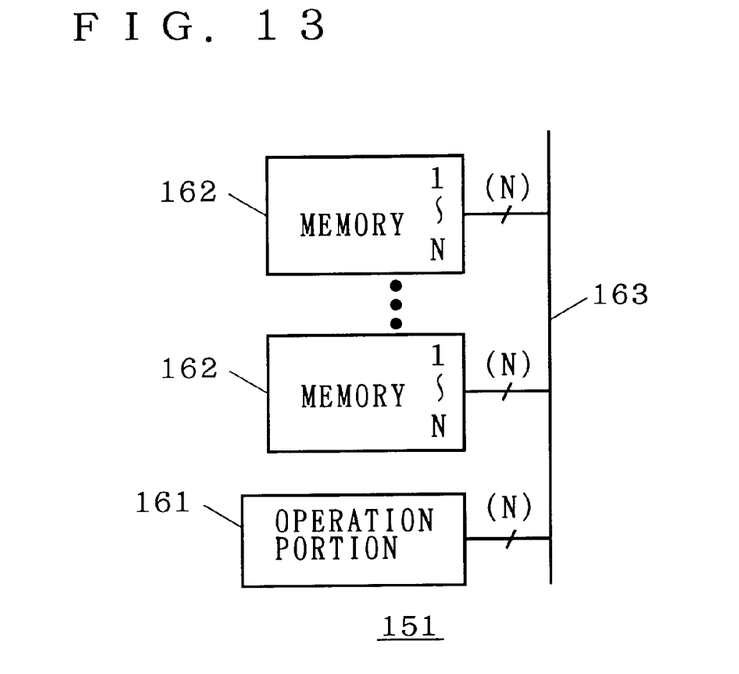
FIG. 13 is a block diagram showing a structure of a conventional device.

FIG. 13 is a block diagram showing the structure of a conventional data processing device as a background of the present invention. In this conventional device 151, an operation portion 161 containing a microcomputer (hereinafter referred to as a CPU) is connected to memory portions 162 through a bus line 163. The memory portions 162 include DRAMs (Dynamic RAMs), for example. The device portions 161, 162 are formed of individual semiconductor chips (semiconductor substrates).

In this device 151, the operation portion 161 reads and writes data signals from and into the memory portions 162 in units of N bits. The bus line 163 provides the advantage that the memory space accessed by the operation portion 161 can freely be extended by connecting a plurality of memory portions 162.

With the device 151, however, such delays as cannot be neglected occur in transmission of data signals because the data signals are read and written through the interconnection 163 provided outside the semiconductor chips. Further, the number of bits, N, which can be written and read in parallel is limited because one semiconductor chip can be equipped with only a limited number of pins (terminals).

The delays in data signals and the limitation in the number of parallel bits, N, raise the problem that it is impossible to increase the amount of data signals that the operation portion 161 can read and write per unit time, or to increase the transmission speed of data signals. The delays in transmission speed of data signals appear as delays in processing speed of the device 151.

Figure 14:
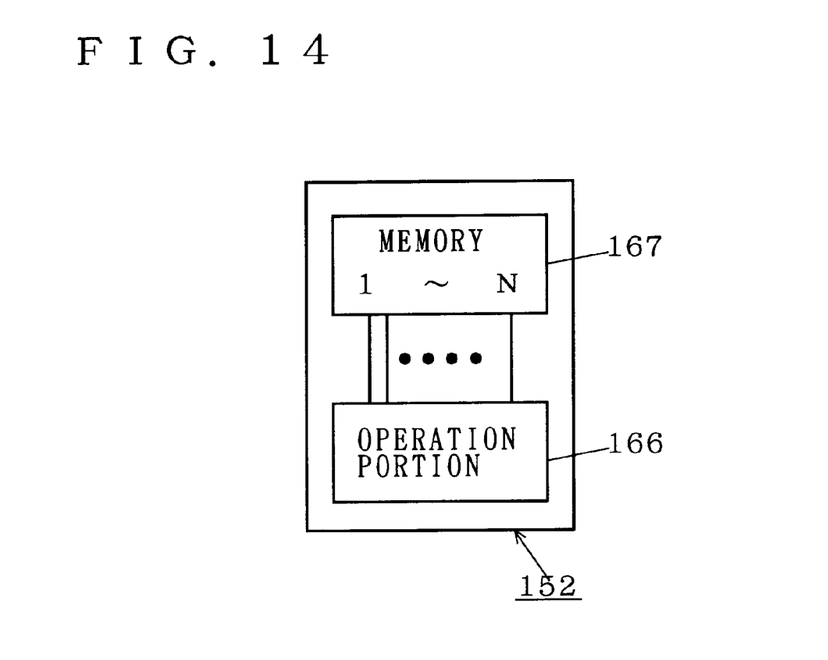
FIG. 14 is a block diagram showing another example of a structure of a conventional device.

FIG. 14 is a block diagram showing another conventional device which was made mainly to solve this problem. In this device 152, both of the operation portion 166 and the memory portion 167 are built in one semiconductor chip, or in a so-called single chip. Accordingly, N-bit-unit data signals are transmitted between the operation portion 166 and the memory portion 167 within a single semiconductor chip.

This suppresses the delays in data signal transmission. Further, since it is not necessary to attach N pins to a single semiconductor chip, the number, N, of signals transmitted in parallel is not limited by the restriction of the number of pins. This, too, improves the transmission speed of data signals read or written by the operation portion 166.

However, the device 152 causes another problem that the size of the storage capacity of the memory portion 167 is limited since the operation portion 166 and the memory portion 167 are built in a single semiconductor chip. Usually, a microcomputer requires semiconductor memory having a storage capacity far exceeding the semiconductor memory capacity which can be built in a single semiconductor chip.

For example, with present DRAM fabrication technology, DRAM storage capacity that can be built in a single semiconductor chip is 16 megabits (=2 megabytes). On the other hand, a CPU with ordinary performance currently requires semiconductor memory with a storage capacity of about 8 to 16 megabytes. It is well known that users of personal computers ensure required storage capacities by adding DRAMs.

In the process of advances in semiconductor technology, it is empirically known by the name of "Amdahl's Law" that the performance of CPU and the storage capacity of semiconductor memory required by the CPU are in proportion to each other. Accordingly, even if semiconductor technology advances on in future, the structure of the device 152 in which the operation portion 166 having a CPU and the memory portion 167 having DRAM are built in a single semiconductor chip will leave the problem of lack of storage capacity unsolved.

SUMMARY OF THE INVENTION

According to a first aspect of the present invention, a data processing device comprises: m (m≧2) operation portions; m memory portions; and an interconnection for coupling the m operation portions and the m memory portions; wherein the m operation portions respectively comprise m CPUs, and the m memory portions respectively comprise semiconductor memories.

The m semiconductor memories can store a sequence of data signals of N (N≧2) bit width including a program defining operation of the m CPUs, data signals being bit-sliced into m sliced signals respectively having bit widths L1, L2, . . . , Lm (L1, L2, . . . , Lm≧1, L1+L2+ . . . +Lm=N) and the m sliced signals being respectively allocatable to the m semiconductor memories, and the m CPUs sequentially read the data signals of N bit width stored in the entirety of the m semiconductor memories and sequentially execute processings based on the data signals of N bit width, wherein m pairs each of which includes one of the m operation portions and one of the m memory portions are, respectively, formed in m separate single semiconductor chips which are separated from each other.

Preferably, according to a second aspect, in the data processing device, each of the m CPUs reads the data signals of N bit width stored in the entirety of the m semiconductor memories and sequentially executes processings based on the data signals of N bit width, and as a result, the m CPUs execute same processings.

Preferably, according to a third aspect, in the data processing device, the m operation portions further comprise m first interfaces respectively coupled to the m CPUs, the m memory portions further comprise m second interfaces respectively coupled to the m semiconductor memories, and the interconnection links the m first and second interfaces to couple each of the m CPUs to all of the m semiconductor memories.

The m second interfaces respectively read the m sliced signals from the m semiconductor memories, and each of the m first interfaces receives all of the m sliced signals which have been respectively read by the m second interfaces and reconfigures the data signals of N bit width, and then inputs the data signals of N bit width to one of the m CPUs which belongs to one of the m operation portions in common therewith, wherein the first and second interfaces changeably set the bit widths L1, L2, . . . , Lm in response to a select signal inputted from outside.

Preferably, according to a fourth aspect, in the data processing device, each of the m semiconductor memories is readable and writable, and the m first interfaces respectively cut out m cut signals respectively having the bit widths L1, L2, . . . , Lm which have been changeably set from m N-bit-wide data signals outputted from the m CPUs and respectively provide the m cut signals to the m second interfaces.

The m second interfaces respectively write the m cut signals as the m sliced signals in the m semiconductor memories, wherein when the m cut signals are respectively transferred from the m first interfaces to the m semiconductor memories through the m second interfaces, each of the m cut signal is transferred within same one of the m single semiconductor chips.

Preferably, according to a fifth aspect, in the data processing device, each of the m semiconductor memories is readable and writable, and when the m CPUs write the data signals of N bit width into the m semiconductor memories, the m CPUs respectively write the m sliced signals formed by bit-slicing of the data signals into the m semiconductor memories, wherein when the m sliced signals are respectively transferred from the m CPUs to the m semiconductor memories, each of the m sliced signals is transferred within same one of the m single semiconductor chip.

Preferably, according to a sixth aspect, in the data processing device, each of the m CPUs reads only one of the m sliced signals having a bit width Li (i is one of 1, 2, . . . m) stored in one of the m semiconductor memories which is formed in one of the m single semiconductor chips in common therewith and at least the entirety of the m CPUs sequentially executes processing based on the data signals of N bit width.

Preferably, according to a seventh aspect, in the data processing device, each of the m CPUs comprises a decode portion and an executing portion, and every time the decode portion decodes one of the m sliced signals, the decode portion supplies the obtained decode information to all of other CPUs and receives decode information obtained by all of other CPUs to complete decoding of the data signals of N bit width, and the executing portion receives decoded results of the data signals of N bit width obtained in the decode portion as an input to execute processing based on the data signals of N bit width.

Preferably, according to an eighth aspect, in the data processing device, each of the m CPUs comprises a fetch portion and an executing portion, and every time the fetch portion fetches one of the m sliced signals, the fetch portion supplies obtained fetch information to all of other CPUs, and the executing portion executes processing based on the data signals through the fetch information signals obtained from the fetch portion and all of the other CPUs.

Preferably, according to a ninth aspect, in the data processing device, the bit widths, L1, L2, . . . , Lm are sized so that L1=L2= . . . =Lm.

According to a tenth aspect of the present invention, a data processing device comprises: m (m≧2) operation portions; m memory portions; and an interconnection for coupling the m operation portions and the m memory portions; wherein the m operation portions respectively comprise m logic circuits, the m memory portions respectively comprise m semiconductor memories, and the m semiconductor memories have a storage capacity of 1 megabit or larger and can store a sequence of data signals of N (N≧2) bit width, the data signals being bit-sliced into m sliced signals respectively having bit widths L1, L2, . . . , Lm (L1, L2, . . . , Lm≧1; L1+L2+ . . . +Lm=N) and the m sliced signals being respectively allocatable to the m semiconductor memories.

The m logic circuits are sequentially supplied with the data signals of N bit width stored in the entirety of the m semiconductor memories and sequentially execute processings based on the data signals of N bit width, wherein m pairs each of which includes one of the m operation portions and one of the m memory portions are, respectively, formed in a separate single semiconductor chip.

According to the device of the first aspect, data signals are allocated among and stored in m (a plurality of) semiconductor memories in a bit-sliced form, and m (a plurality of) CPUs can, as the entirety, or individually, use the data signals of N bit width stored in the entirety of the m semiconductor memories through the interconnection. This ensures a storage capacity enlarged m times larger than that of one semiconductor memory formed in a single semiconductor chip as the semiconductor memory storage capacity that the m CPUs can use.

Furthermore, since each single semiconductor chip includes a CPU, required as interconnection coupling the individual single semiconductor chips is only an interconnection for transmitting data signals from the m semiconductor memories to the m CPUs or an interconnection for exchanging information signals between the m CPUs. Accordingly, no problem is caused by delay in transmission of other signals, such as address signals. Moreover, since pins attached to each single semiconductor chip can be exclusively used for the interconnection for transmitting the data signals or information signals, it is possible to extend the bit width of these signals. This improves processing speed of the device.

According to the device of the second aspect, each of the m CPUs executes processing on the basis of an N-bit-wide data signal stored in the entirety of the m semiconductor memories. It is then not necessary to exchange information signals between the m CPUs, which simplifies the device structure and thus facilitates device design.

According to the device of the third aspect, the first and second interfaces can change the sizes of the bit widths L1, L2, . . . , Lm according to a select signal. Accordingly, it is possible to form data processing devices of a plurality of kinds with different bit widths L1, L2, . . . , Lm by using semiconductor chips each including an operation portion and a memory portion. This allows production of data processing devices at low cost.

According to the device of the fourth aspect, each of the m semiconductor memories is a readable and writable memory such as a DRAM, where the bit widths of written data signals correspond to read bit widths L1, L2, . . . , Lm and are variable. This allows the m CPUs to store data signals obtained by operation processings into the m semiconductor memories and read them from the m semiconductor memories for use in operation. Furthermore, when writing, the data signals are exchanged within the same semiconductor chip, so that no problem is caused by transmission delay of the data signals when writing. That is to say, a data processing device with high processing speed and good usefulness can be produced at low cost.

According to the device of the fifth aspect, each of the m semiconductor memories is a readable and writable memory such as a DRAM, where the bit widths of written data signals correspond to read bit widths L1, L2, . . . , Lm. This allows the m CPUs to store data signals obtained by operation processings into the m semiconductor memories and read them from the m semiconductor memories for use in operation. Furthermore, when writing, the data signals are exchanged within the same semiconductor chip, so that no problem is caused by transmission delay of the data signals when writing. This is to say, a data processing device with high processing speed and good usefulness can be produced.

According to the device of the sixth aspect, each of the m CPUs reads only the data signals stored in the semiconductor memory formed in the same single semiconductor chip, which improves transmission speed of the data signals transmitted from the semiconductor memories to the CPUs. This shortens the time required for fetching which is one of time-consuming cycles in the processing cycles of the CPU.

According to the device of the seventh aspect, the m CPUs exchange necessary information signals in the process of decoding which can be achieved in a short time so that they do not have to exchange information signals in the time-consuming process of processing by the executing portions. Thus shortening the time for fetching effectively contributes to improvement of processing speed of the CPUs without increasing the processing time for the executing portions.

According to the device of the eighth aspect, the m CPUs exchange fetch information signals outputted from the fetch portions, which simplifies the device structure. Further, the exchange of fetch information signals can be completed in the process of decoding which can be achieved in a short time. In this case, shortening the time for fetching effectively contributes to improvement of processing speed of the CPUs without increasing the processing time for the executing portions.

According to the device of the ninth aspect, data signals are equally bit-sliced, so that m individual semiconductor chips can be equally constructed in their main parts. This reduces the costs required for production of the data processing device.

According to the device of the tenth aspect, data signals are allocated among and stored in m (a plurality of) semiconductor memories in a bit-sliced form, and m (a plurality of) logic circuits can, as the entirety, or individually, use the data signals of N bit width stored in the entirety of the m semiconductor memories through the interconnection. This ensures a storage capacity enlarged m times that of one semiconductor memory formed in a single semiconductor chip as the semiconductor memory storage capacity that the m logic circuits can use.

Furthermore, since each single semiconductor chip includes a logic circuit, required as interconnection coupling individual single semiconductor chips is only the interconnection for transmitting data signals from the m semiconductor memories to the m logic circuits. Accordingly, no problem is caused by delay for transmission of singles other than the data signals. Moreover, since pins attached to each single semiconductor chip can be exclusively used for the interconnection for transmitting the data signals from the m semiconductor memories to the m logic circuits, it is possible to extend the bit width of the data signals. This improves transmission speed of the data signals and thus improves processing speed of the device.

Thus, it is an object of the present invention to provide a data processing device which can compatibly improve processing speed and ensure storage capacity required for semiconductor memory.

These and other objects, features, aspects and advantages of the present invention will become more apparent from the following detailed description of the present invention when taken in conjunction with the accompanying drawings.

DESCRIPTION OF THE PREFERRED EMBODIMENTS

1. First Preferred Embodiment

Figure 1:
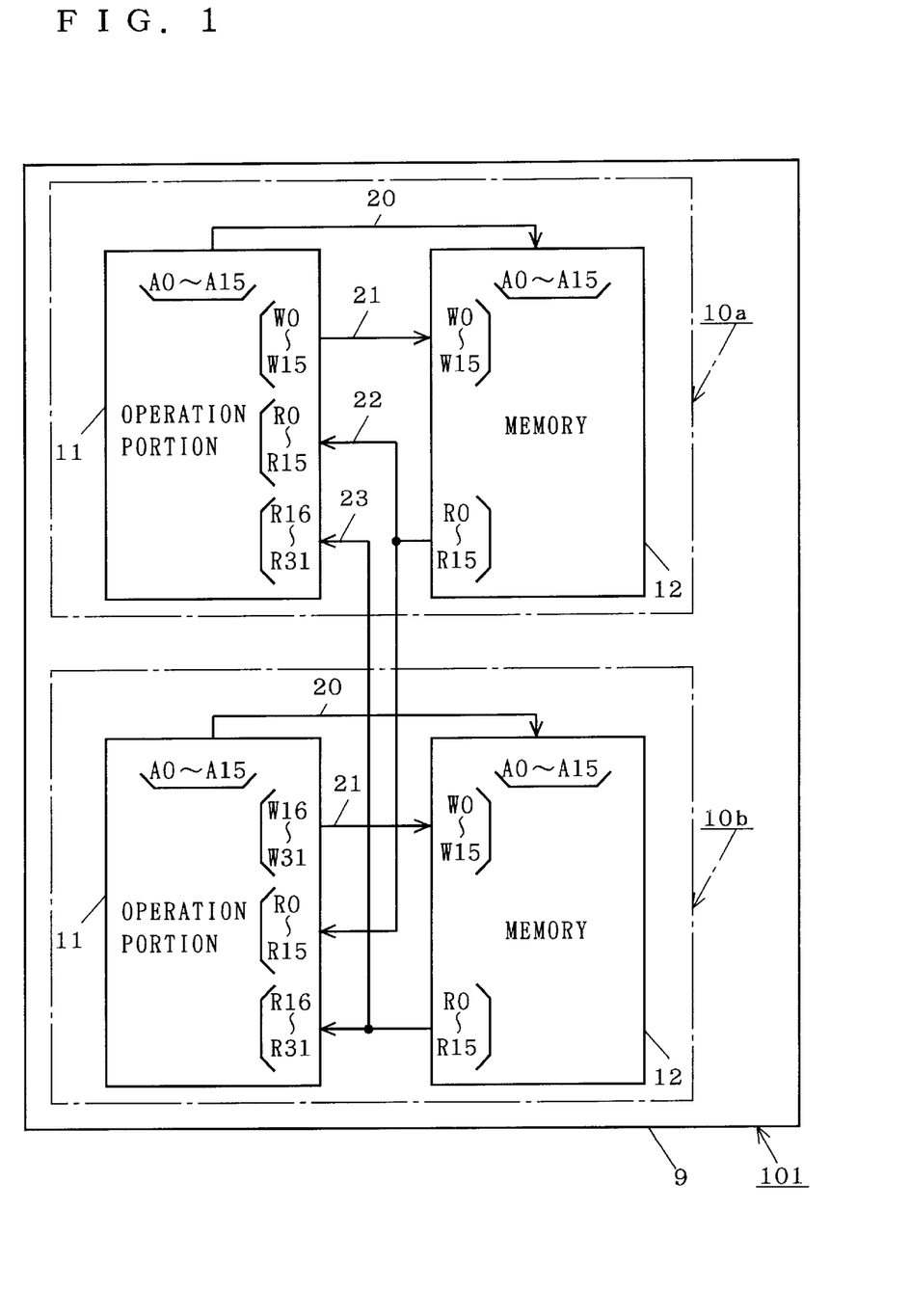
FIG. 1 is a schematic block diagram of a device according to a first preferred embodiment.

First, a data processing device according to a first preferred embodiment will be described.
1—1. Outline of Structure FIG. 1 is a block diagram showing the rough structure of a data processing device according to a first preferred embodiment. This device 101 has a substrate 9 on which two data processing units 10a, 10b are connected in parallel to each other. The unit 10a is formed of a single semiconductor chip and the unit 10b is formed of another single semiconductor chip. Each of the units 10a and 10b has an operation portion 11 and a memory portion 12.

Each operation portion 11 has a CPU which executes operation processing of data signals in units of 32 bits. The operation portion 11 receives data signals in units of 32 bits through ports R0 to R31. As to its outputs, the operation portion 11 outputs data signals in units of 16 bits, half of 32 bits, through ports W0 to W15 or ports W16 to W31.

Each memory portion 12 has a DRAM having a storage capacity exceeding 1 megabit. Data signals are written into the memory portion 12 in units of 16 bits through ports W0 to W15 and data signals are read in units of 16 bits through ports R0 to R15. The "port" indicates, for convenience, a point in the interconnection provided on the semiconductor chip, which, unlike a pin for relaying signals to/from the outside, does not especially occupy a large area. Accordingly, the number of ports is not limited like pins.

The units 10a and 10b are equipped with interconnections 20 to 23. In either of the units 10a and 10b, address signals outputted from ports A0 to A15 of the operation portion 11 are transmitted to ports A0 to A15 of the memory portion 12 through the interconnection 20. The address signals are signals for specifying memory cells in the DRAM in the memory portion 12. Data signals outputted from the ports W0 to W15 or the ports W16 to W31 of the operation portion 11 are transmitted to the ports W0 to W15 of the memory portion 12 through the interconnection 21.

Data signals read from the ports R0 to R15 of the memory portion 12 in the unit 10a are transmitted to the ports R0 to R15 of the operation portions 11 belonging to the units 10a, 10b through the interconnection 22. Data signals read from the ports R0 to R15 of the memory portion 12 in the other unit 10b are transmitted to the ports R16 to R31 of the operation portions 11 belonging to the units 10a, 10b through the interconnection 23.

The DRAM included in each memory portion 12 contains program and data required by the CPU in the operation portion 11 to perform operation processing. The lower 16 bits and upper 16 bits forming a 32-bit-wide unit data signal read and written by the operation portions 11 are stored in the memory portions 12 belonging to the two units 10a, 10b, respectively. That is to say, data signals read and written by the operation portions 11 are "bit-sliced" and separately stored in the memory portions 12.

A 32-bit-wide data signal is inputted in common to the operation portions 11 through the interconnections 22 and 23. Hence, the CPUs in the operation portions 11 perform entirely the same operation processing in both units 10a and 10b. In the data signal obtained as the result of the same operation processing, the lower 16 bits are written into the memory portion 12 from the ports W0 to W15 of the operation portion 11 in the unit 10a and the upper 16 bits are written into the memory portion 12 from the ports W16 to W31 of the operation portion 11 in the unit 10b, for example.

That is to say, the operation portions 11 belonging to the units 10a and 10b share the two memory portions 12. Hence, each operation portion 11 can use a memory space twice larger than the memory space of a single memory portion 12. In other words, it is possible to allow each operation portion 11 to ensure an accessible semiconductor memory space over the limitation of a single semiconductor chip.

Further, in the data signals exchanged between the operation portion 11 and the memory portion 12, data signals written from the operation portion 11 to the memory portion 12 are transmitted within a single semiconductor chip, without the necessity of being relayed through interconnection provided outside the single semiconductor chip. Accordingly, no problem is caused by delays in transmission of the written data signals. Further, since address signals are also transmitted through the interconnections 20 each provided inside a single semiconductor chip, no problem is caused by delays in transmission of address signals, either.

Moreover, since it is not necessary to output written data signals outside a single semiconductor chip, and it is not necessary, either, to externally extend the interconnections 20 for transmitting address signals, the pins which can be attached to a single semiconductor chip can be exclusively used to relay the data signals inputted to the ports R0 to R31 of the operation portions 11. Accordingly, data signals with an increased number of bits can be inputted to the operation portions 11 at the same time and in parallel. In other words, it is possible to increase the bit width of input data signals. This improves the transmission speed of data signals and also allows the bit width as a unit of processing by the CPU to be increased to a width of 64 bits or 128 bits, for example. This further improves the processing speed of the device.

That is to say, the device 101 can ensure storage capacity for the operation portions 11 over the restriction of a single semiconductor chip while maintaining high processing speed of the device. That is to say, it is possible to simultaneously alleviate or solve the two problems which cannot be avoided by the conventional devices 151 and 152 at the same time.

1-2. Detailed Structure

Figure 2:
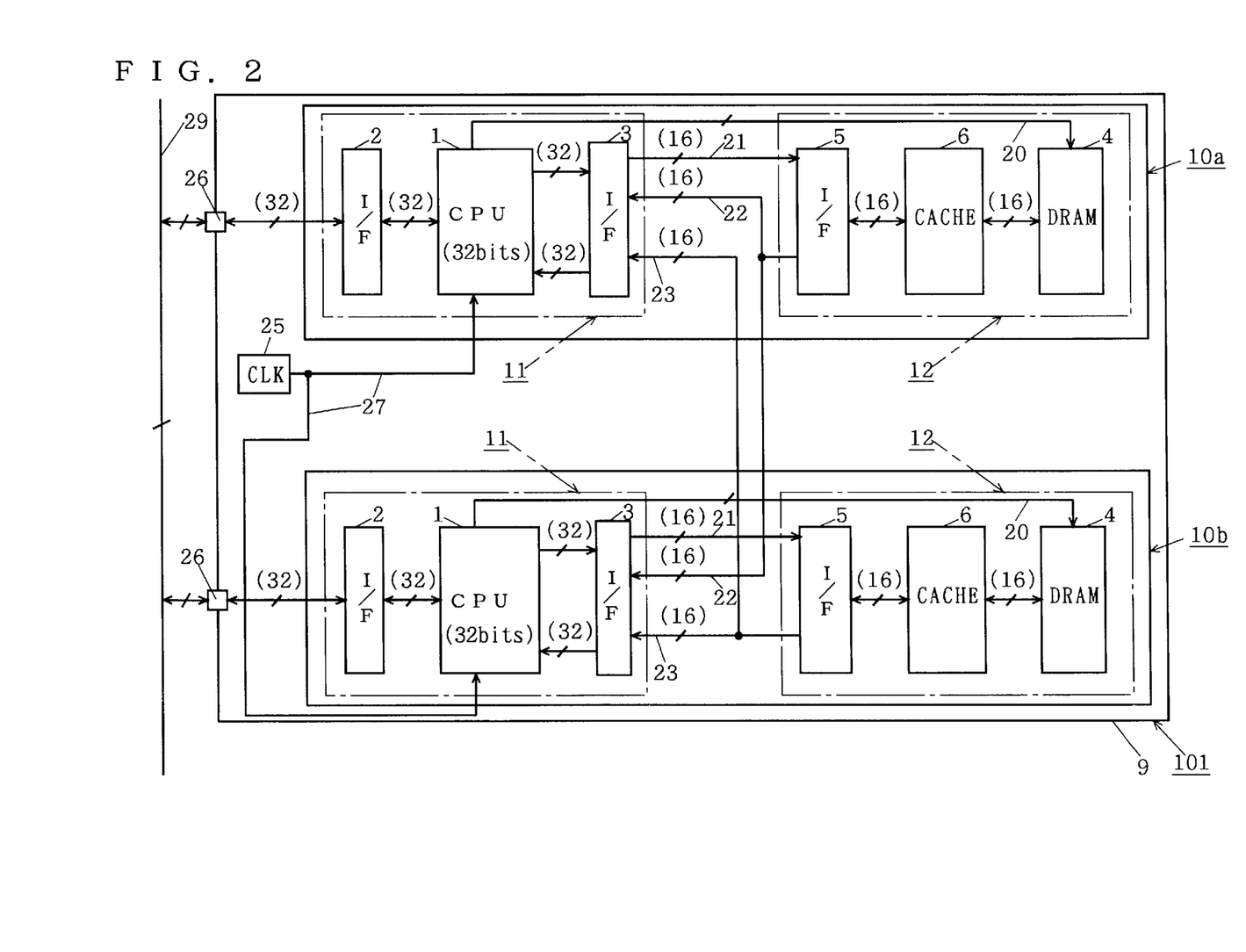
FIG. 2 is a detailed block diagram showing the device of the first preferred embodiment.

FIG. 2 is a block diagram more fully showing the structure of the device 101. As shown in FIG. 2, each operation portion 11 includes an input/output interface 2 and a CPU bus interface 3 as wall as a CPU 1. Each memory portion 12 includes a memory bus interface 5 and a cache memory 6 as well as a DRAM 4. The CPUs 1 in the units 10a and 10b are supplied in common with a clock signal generated in a clock generating portion 25 through a clock interconnection 27. Each CPU 1 executes operation processing in steps in synchronization with the clock signal.

The operation portions 11 belonging to the units 10a and 10b are connected to an external bus line 29 provided outside the device 101 through terminals 26 attached to the substrate 9. This allows the operation portions 11 and the external bus line 29 to exchange data signals.

Each input/output interface 2 in each operation portion 11 is a device portion which functions as an interface between the CPU 1 and the external bus line 29. The structure of the input/output interface 2 itself is not described in detail herein because it is conventionally known. The CPU 1 is a so-called 32-bit type CPU which executes operations in units of 32 bits as stated above. In this case, data signals are transferred in units of 32 bits between the CPU 1, the input/output interface 2, the terminal 26 and the external bus line 29. That is to say, they transfer 32-bit-wide data signals. The structure of the CPU 1 is conventionally known, too.

The other interface provided in the operation portion 11, the CPU bus interface 3, functions as an interface between the CPU 1 and the memory portion 12. The CPU bus interface 3 selectively outputs only the upper 16 bits or lower 16 bits in the 32-bit-wide data signal outputted from the CPU 1 onto the interconnection 21. Specifically, the CPU bus interface 3 belonging to the unit 10 a selects the lower 16 bits and the CPU bus interface 3 belonging to the unit 10b selects the upper 16 bits.

The CPU bus interface 3 also sends 32-bit-wide data signals inputted through the interconnections 22 and 23 intactly, i.e., in the width of 32 bits, to the CPU 1. The CPU bus interface 3 has the same structure as a conventionally known CPU bus interface except that it selects (cuts) the bit width when outputting.

A group of instructions for allowing the CPU 1 to execute operation processing, or program, is stored in each DRAM 4 which is the main part of each memory portion 12. The DRAM 4 can also store data obtained by operation processing executed by the CPU 1 as needed. Accordingly, data signals read from the DRAM 4 include instructions forming the program.

Hence, the DRAM 4 has a storage capacity of at least 1 megabit, and representatively, it has a capacity of 16 megabits (=2 megabytes). That is to say, although the DRAM 4 is a volatile semiconductor storage device as well as a register provided in the CPU 1 for the purpose of temporarily holding data signals, it is clearly discriminated from it in its role and required storage capacity.

Each cache memory 6 is provided for the purpose in increasing the speed for reading data signals from the DRAM 4. Each memory bus interface 5 is a device portion which functions as an interface between the DRAM 4 and the operation portion 11. Structures of the DRAM 4, the cache memory 6 and the memory bus interface 5 are not described in detail herein because they are all conventionally known device portions.

The memory bus interface 5, the cache memory 6 and the DRAM 4 exchange 16-bit-wide data signals. The lower 16 bits in a data signal outputted from the CPU bus interface 3 belonging to the unit 10a onto the interconnection 21 are inputted to the memory bus interface 5. This signal is then written into the DRAM 4 through the cache memory 6.

Lower 16 bits in 32-bit-wide instructions forming the program are previously stored in the DRAM 4 belonging to the unit 10a. Similarly, upper 16 bits in the 32-bit-wide instructions are previously stored in the DRAM 4 belonging to the unit 10b.

Then the memory portion 12 belonging to the unit 10a provides the lower 16-bit instructions to the CPU bus interface 3 in both units 10a and 10b through the interconnection 22 via the cache memory 6 and the memory bus interface 5. Similarly, the memory portion 12 belonging to the unit 10b provides the upper 16-bit instructions to the CPU bus interfaces 3 in both units 10a and 10b through the interconnection 23 via the cache memory 6 and the memory bus interface 5.

The 32-bit-wide data signals which the CPUs 1 write and read are thus distributed and stored in the two DRAMs 4 without overlap. That is to say, the plurality of DRAMs 4 store the data signals with their bit width divided into a plurality of groups (i.e., bit-sliced).

The same 32-bit-wide instruction is inputted in common to both of the CPUs 1 belonging to the units 10a and 10b. Accordingly, the two CPUs 1 simultaneously execute entirely the same operation processing in synchronization with the common clock signal. As a result, the two CPUs 1 simultaneously output entirely the same data signals. The data signals outputted from the CPU 1 to the CPU bus interfaces 3 are bit-sliced as stated above, and then sent to the memory portions 12.

The data signals outputted from the CPUs 1 to the input/output interfaces 2 are sent intactly, i.e., in the width of 32 bits, to the external bus line 29. Hence, the same data signals are simultaneously outputted from the units 10a and 10b onto the external bus line 29. Alternatively, the input/output interfaces 2 may be constructed so that only one of the units 10a and 10b outputs the data signal onto the external bus line 29.

Like the CPU bus interfaces 3, the input/output interfaces 2 may be constructed to bit-slice the data signals outputted from the CPUs 1 and then output them to the external bus line 29. For example, the input/output interfaces 2 may be constructed so that the lower b 16bits are outputted from the input/output interface 2 in the unit 10a and the upper 16 bits are outputted from the input/output interface 2 in the unit 10b to the external bus line 29.

Data signals inputted from the external bus line 29 to the CPUs 1 are supplied at the same time to both of the units 10a and 10b with a width of 32 bits. This enables the two CPUs 1 belonging to the units 10a and 10b to always execute the same operation processing at the same time.

As described above, the device 101 can be constructed with combinations of conventionally known device portions except that the plurality of operation portions 11 and the plurality of memory portions 12 are characteristically coupled through the interconnections 21 to 23 with the CPU bus interfaces 3 modified in a simple way. That is to say, unlike the conventional devices 151 and 152, the device 101 compatibly realizes the improvement of processing speed of the device and the improvement of the storage capacity without requiring specially complicated structure.

1-3. Expansion of the Device 101

The device 101 shown in FIG. 1 and FIG. 2 is an example in which a 32-bit-wide data signal is bit-sliced into two groups of 16-bit-wide signals and then stored in the two DRAMs 4. Generally, when each CPU 1 performs operation processing in units of N (>2) bits, the device 101 can be extended so that each signal is bit-sliced into N/L groups of signals with a bit width L ($1 \leq L \leq N/2$) and stored into N/L DRAMs 4. The device 101 shown in FIG. 1 and FIG. 2 corresponds to an example in which N=32 and L=16, or in which the number of groups is the minimum (=2).

Figure 3:
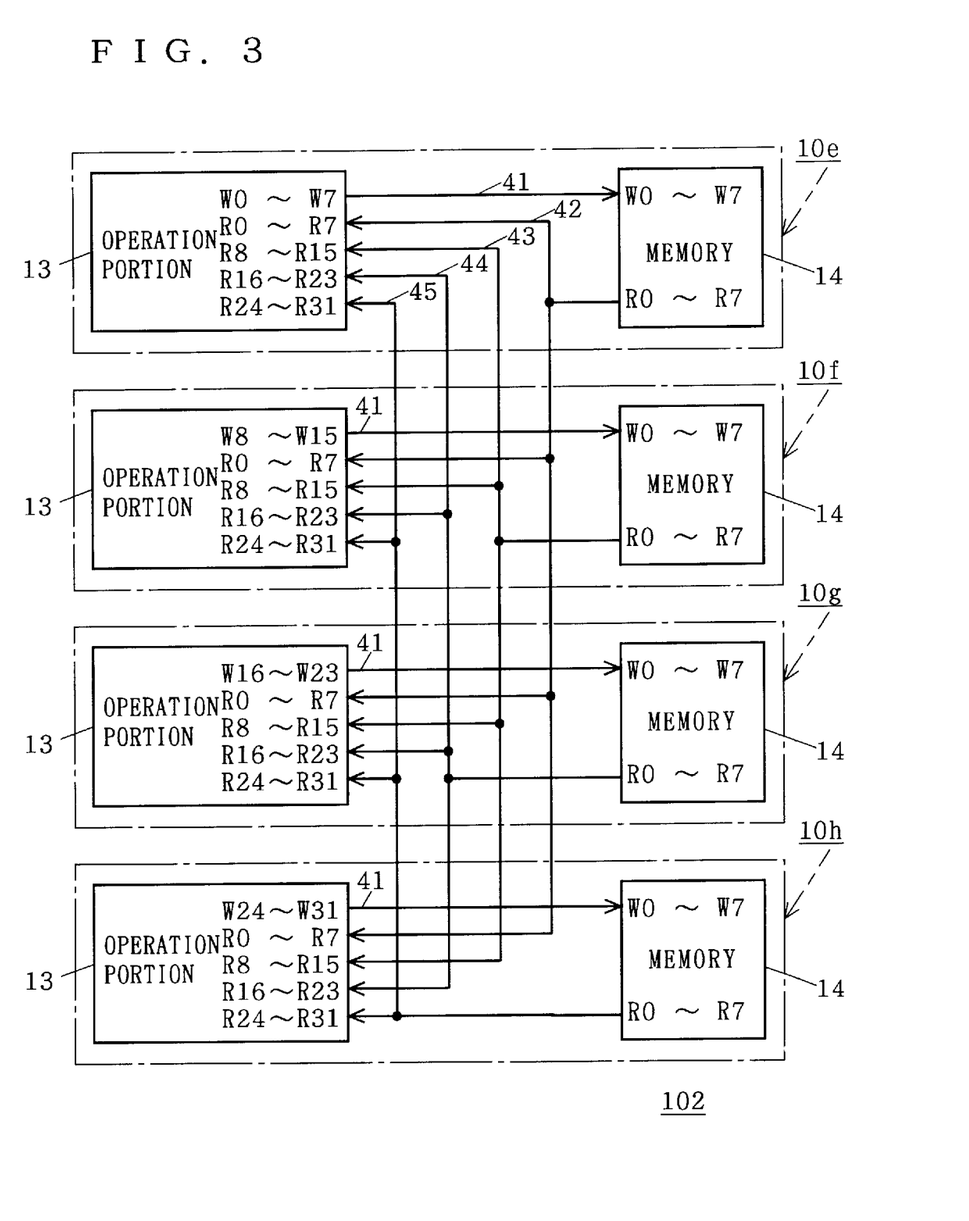
FIG. 3 is a block diagram showing another example of the device according to the first preferred embodiment.

Generally, the greater the number of groups (=N/L) becomes, the larger the memory space that the CPU 1 can access (i.e., the storage capacity) extends. FIG. 3 shows an example with N=32 and L=8. This device 102 includes four units 10e to 10h. Each of the units 10e to 10h includes an operation portion 13 and a memory portion 14.

Each memory portion 14 can read and write data signals in units of 8 bits. One operation portion 13 cuts out 8 bits from a 32-bit-wide data signal obtained by operation processing to be executed by the CPU 1 (not shown), which are written into the memory portion 14 belonging to the same one of the units 10e to 10h through the interconnection 41. Inputted to one operation portion 13 is a 32-bit-wide data signal formed by collecting data signals read in a width of 8 bits from the memory portions 14 through the interconnections 42 to 45.

With this device 102, if the area of a single semiconductor chip and the degree of element integration are equivalent to those of the device 101, this device 102 enables the CPUs 1 to access a memory space twice as large as that provided in the device 101. There is no difference between the device 101 and the device 102 in the number of pins required for each semiconductor chip to send data signals read from each memory portion 14 to the individual operation portions 13.

Accordingly, the device 102 can increase the bit width of the data signals inputted to the operation portions 13 to about the same extent as the device 101. That is to say, the device 102 enables the operation portions to access a memory space enlarged larger than that in the device 101 while maintaining the transmission speed of data signals comparable to that of the device 101.

Although FIG. 1 to FIG. 3 have shown examples in which an N-bit-wide data signal is equally bit-sliced into signals with the same data width L (<N/2), the device can be constructed to unequally bit-sliced signals. That is to say, it is possible to construct the device to that an N-bit-wide data signal is bit-sliced into m (>2) groups with data widths L1, L2, . . . , Lm. At this time, the relation L1+L2+ . . . +Lm=N holds.

However, when L1=L2= . . . =Lm=L, that is, when the signal is equally bit-sliced, the structure provides the advantage that the individual semiconductor chips (e.g., the units 10a, 10b) can be identically constructed in the main parts excluding the CPU bus interfaces 3 (FIG. 2).

2. Second Preferred Embodiment

Figure 4:
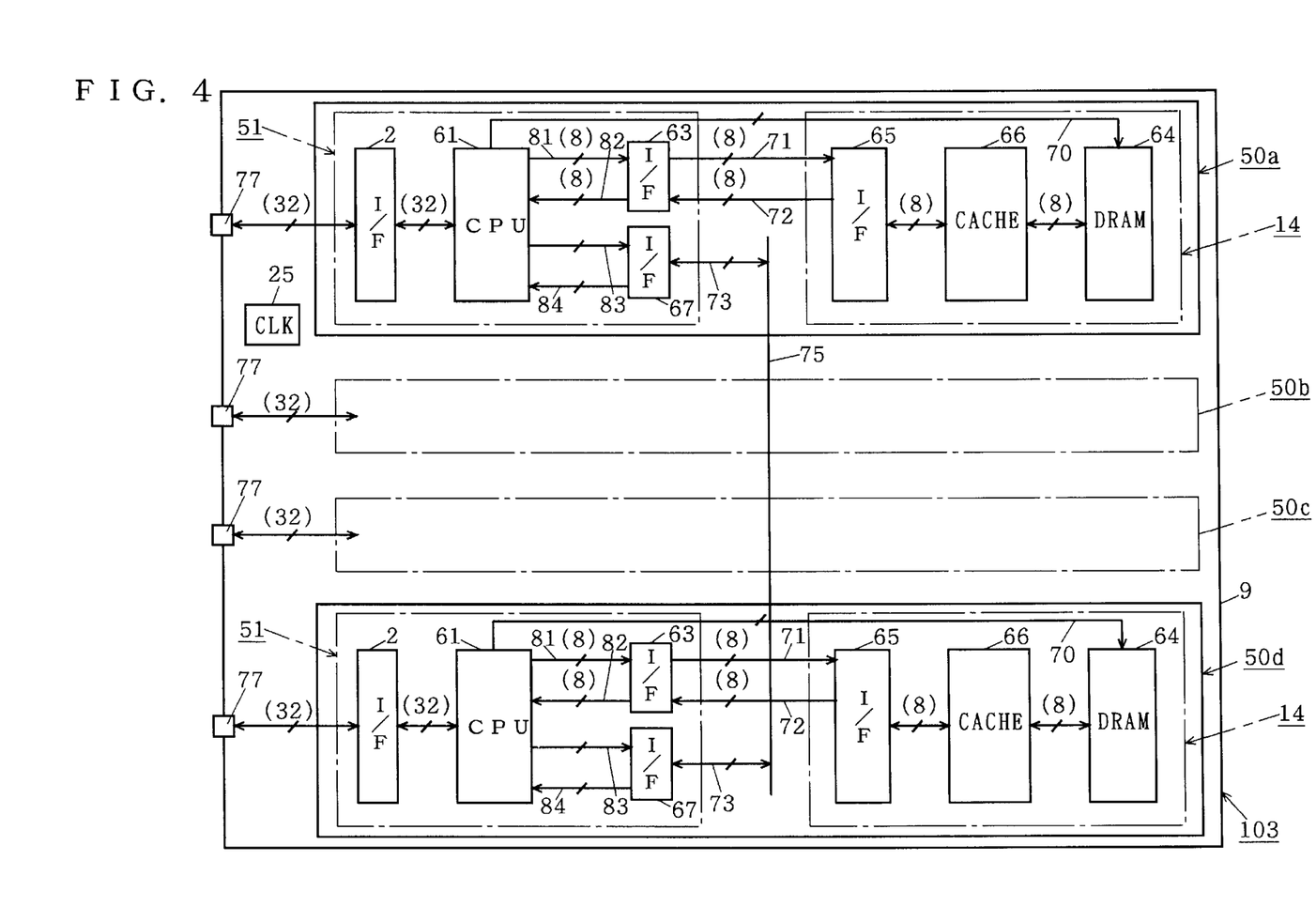
FIG. 4 is a block diagram showing a device according to a second preferred embodiment.

FIG. 4 is a block diagram showing the structure of a data processing device according to a second preferred embodiment. This device 103 characteristically differs from the devices 101 and 102 of the first preferred embodiment in that the CPUs 61 belonging to the units 50a to 50d share at least part of operation processing, instead of performing entirely the same operation processing.

The units 50a to 50d provided on the substrate 9 are each formed of a single semiconductor chip. Each of the single semiconductor chips is equipped with an operation portion 51 and a memory portion 14. Each memory portion 14 includes a memory bus interface 65 and a cache memory 66, as well as a DRAM 64 as the main portion. The DRAM 64, the cache memory 66 and the memory bus interface 65 are identically constructed and identically function to the DRAM 4, the cache memory 6 and the memory bus interface 5 shown in FIG. 1 except that they treat data signals of different bit widths.

Each operation portion 51 has an input/output interface 2 and the CPU bus interfaces 63 and 67, as well as the main portion or the CPU 61. The CPUs 61 belonging to the units 50a to 50d are supplied with a clock signal generated in the clock generating portion 25 in common through a clock interconnection not shown. Each CPU 61 executes operation processing in steps in synchronization with the clock signal. The operation portions 51 belonging to the units 50a to 50d can be connected to an external bus line (not shown) provided outside the device 103 through terminals 77 attached to the substrate 9.

The CPU 61 of 32-bit type, the input/output interface 2, the terminal 77 and the external bus line exchange 32-bit-wide data signals. In each of the units 50a to 50d, the CPU 61 and the memory portion 14 exchange bit-sliced 8-bit-wide data signals through the CPU bus interface 63 and interconnections 71 and 72, and 81 and 82.

Further, the CPUs 61 belonging to the units 50a to 50d exchange decoded information signals or fetch information signals with each other through an internal bus line 75, the CPU bus interfaces 67 and the interconnections 83 and 84. Addressing to each DRAM 64 is achieved with an address signal sent from the CPU 61 through the interconnection 70.

Figure 5:
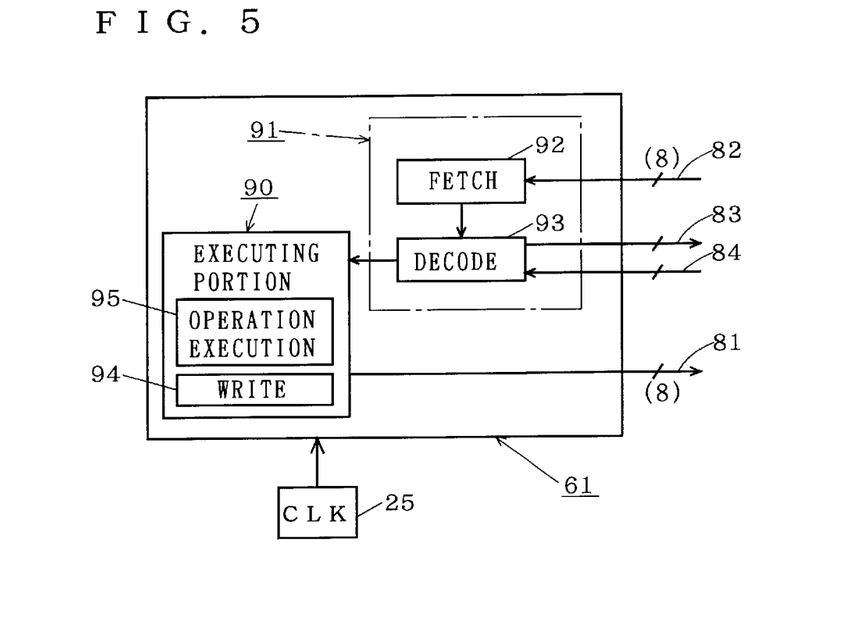
FIG. 5 is a block diagram of the CPU of the second preferred embodiment.

FIG. 5 is a block diagram showing the internal structure of a CPU 61. Similarly to a conventionally known CPU, the CPU 61 includes an executing portion 90 and a control portion 91. The control portion 91 includes a fetch portion 92 and a decode portion 93, and the executing portion 90 includes an operation executing portion 95 and a write portion 94. The fetch portion 92 is a device portion for capturing instructions stored in the DRAM 64 through the interconnection 82. The instructions captured are not the 32-bit-wide instructions, but are bit-sliced 8-bit-wide partial instructions forming parts of the instructions.

A partial instruction captured is independently converted into a decoded information signal by the decode portion 93. Since the partial instruction forms just part of the instruction, the executing portion 90 cannot perform normal execution processing only with the decoded information signal. The decode portion 93 therefore sends the decoded information signal to the CPU bus interface 67 through the interconnection 83.

The CPU bus interface 67 sends the decoded information signal, which was given from the decode portion 93, to the internal bus line 75 through the interconnection 73. This operation is performed in the same way in all of the units 50a to 50d. That is to say, the internal bus line 75 is supplied with the decoded information signals from the four operation portions 51 at the same time.

Each decode portion 93 receives, through the CPU bus interface 67 and the interconnection 84, the decoded information signals which are supplied from the other three decode portions 93 onto the internal bus line 75. Then the decode portion 93 refers to the received decoded information signals to finally achieve decoding of the 32-bit-wide instructions. The resultant decoded signal is sent to the executing portion 90.

The executing portion 90 performs execution processing on the basis of the decoded signal. Accordingly, the respective executing portions 90 belonging to the units 50a to 50d perform the same processing on the basis of the same decoded signal. Furthermore, the execution processings are performed at the same time in synchronization with the clock signal supplied from the clock generation portion 25. The execution processings are performed by the operation executing portions 95 provided in the executing portions 90. The data signals obtained by the execution processings are sent from the operation executing portions 95 to the write portions 94.

Each write portion 94 cuts the 32-bit-wide data signal into a width of 8 bits and then outputs them to the CPU bus interface 63 through the interconnection 81. Or, the write portion 94 may output the data signal intactly as 32-bit-wide, and the CPU bus interface 63 may cut it out into a width of 8 bits. Thus, unlike the CPUs 1 (FIG. 2), the CPUs 61 belonging to the units 50a to 50d share part of the processing, instead of performing all processing at the same time.

Figure 6:
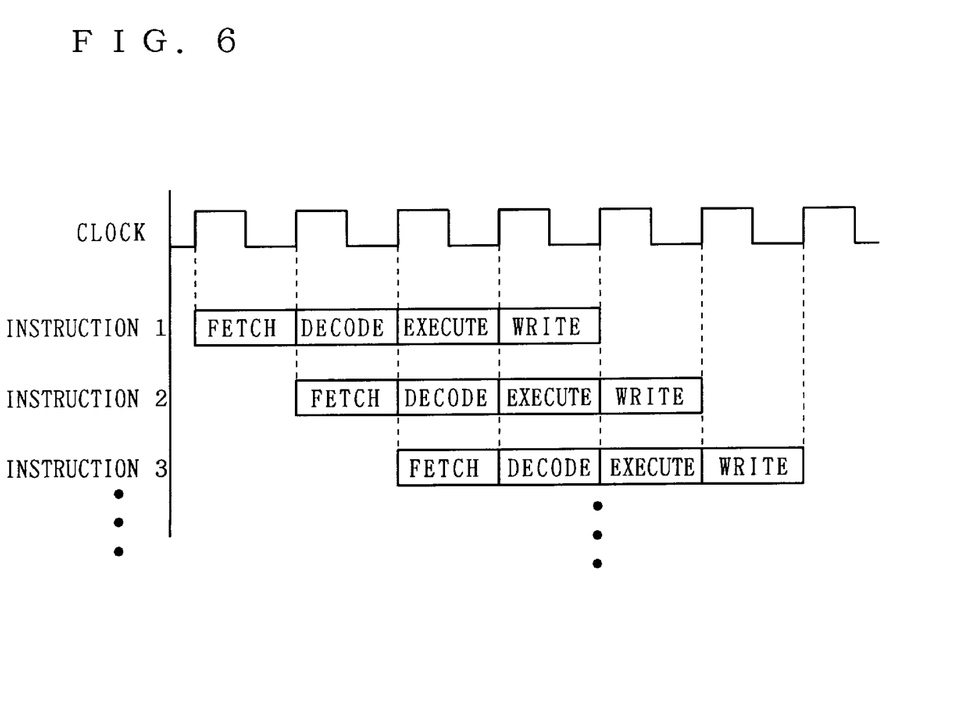
FIG. 6 is an explanation diagram showing operation of pipeline processing by the CPU of the second preferred embodiment.

The series of processing from fetching to writing is repeatedly executed in the form of so-called pipeline processing in synchronization with the clock signal supplied from the clock generating portion 25. FIG. 6 is a timing chart illustrating the pipeline processing in the CPU 61. As shown in FIG. 6, the fetch portion 92 sequentially captures instructions 1, 2, 3, . . . from the DRAM 64 in synchronization with pulses of the clock signal. More correctly, as stated above, a fetch portion 92 belonging to one CPU 61 captures partial instructions forming part of the instructions.

When focusing on a flow of processing of one instruction, e.g., the instruction 1, it is fetched by the fetch portion 92, decoded by the decode portion 93, executed by the operation executing portion 95, and written by the write portion 94 serially for each pulse of the clock signal. That is to say, the series of processing of one instruction 1 is sequentially executed by each device portion for each pulse of the clock signal.

Then at the pulse of the clock signal appearing one pulse later, the series of processing of the next instruction 2 is sequentially performed in the same way. Accordingly, when focusing on one device portion, e.g., the decode portion 93, it decodes the instructions 1, 2, 3, . . . in order without interruption for each pulse of the clock signal. The CPU 61 processes instructions one after another according to such a system called "pipeline processing."

Figure 7:
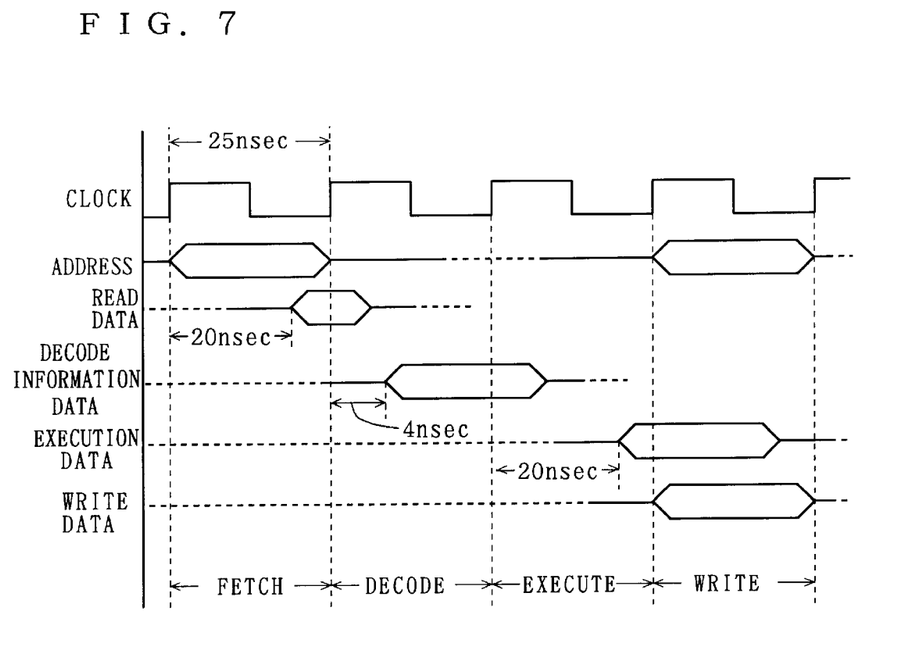
FIG. 7 is an explanation diagram showing operation in one instruction cycle of the CPU of the second preferred embodiment.

FIG. 7 is a timing chart more fully showing the flow of processing from fetching to writing according to one instruction. In this example, the cycle of the clock signal is set to 25 nsec. In the clock period in which fetch is performed, a certain address signal is outputted immediately after the beginning. A considerable delay usually occurs from the beginning of output of the address signal up to the arrival of the instruction (read data in FIG. 7) stored in the DRAM 64 arrives at the fetch portion 92. In the example shown in FIG. 7, this delay is 20 nsec.

In the next clock period, decoding is performed. It takes only about 4 nsec before the decoded information signal is outputted after the beginning of the decoding period. Decoding is achieved in a shorter time than fetching. The decoded information signal is exchanged among the four decode portions 93. After that, such a decoded signal as can be executed by the executing portion 90 is finally outputted. Since the decoded information signal can be obtained in such a short time as about 4 nsec, the final decoded signal can be obtained in a period of 25 nsec with a sufficient margin.

In the next clock period, the operation executing portion 95 performs execution processing. Usually, the execution processing, too, requires a considerable time period. In the example shown in FIG. 7, it takes 20 nsec before the execution data signal is outputted as the result of the execution processing after the beginning of the executing period. In the following clock period, the execution data signal is outputted as a write data signal by the write portion 94.

Thus, in the device 103, since data signals are transmitted from the memory portion 14 to the operation portion 51 only through the interconnection 72 provided inside the single semiconductor chip, it solves the problem of transmission delays of data signals. Furthermore, the operation of exchanging signals between the units 50a to 50d over each single semiconductor chip which causes such large delays as cannot be neglected is performed in the decode period which is a clock period least pressed for time. Therefore, reduction in the data signal transmission delay which is achieved in the device 103, effectively contributes to improvement of processing speed.

Moreover, it is possible to exclusively use pins which can be provided on a single semiconductor chip to relay the decoded information signals transmitted through the internal bus line 75. Hence, by increasing the bit width of the decoded information signals exchanged through the internal bus line 75, the speed of transmitting the decoded information signals can be improved, and besides, the bit width which the CPU 61 treats as a unit of processing can be easily extended to a 64-bit width, a 128-bit width, etc. This further improves the processing speed of the device.

Figure 8:
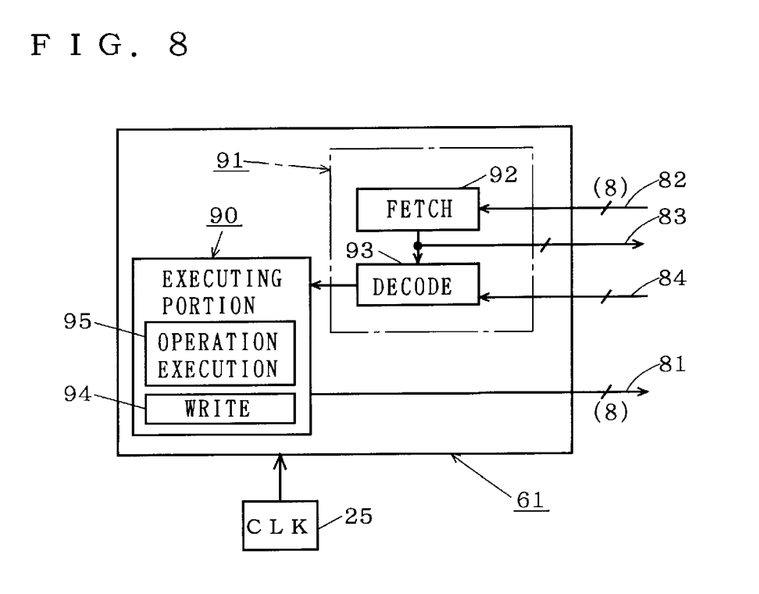
FIG. 8 is a block diagram showing another example of the CPU of the second preferred embodiment.

FIG. 8 is a block diagram showing another example of the internal structure of the CPU 61. This example is characteristically different from the example shown in FIG. 5 in that the interconnection 83 is connected to the output of the fetch portion 92, instead of to the output of the decode portion 93. The fetch portion 92 captures an 8-bit-wide partial instruction forming part of an instruction stored in the DRAM 64 through the interconnection 82 and then outputs a fetch information signal. The fetch portion 92 has a latch circuit, for example, which holds the same signal as the fetched partial instruction at its output as a fetch information signal.

This fetch information signal is supplied to the decode portion 93 and is also sent out to the CPU bus interface 67 through the interconnection 83. The CPU bus interface 67 sends the fetch information signal from the fetch portion 92 onto the internal bus line 75 through the interconnection 73. This operation is made in the same way in all units 50a to 50d. That is to say, the internal bus line 75 is supplied with fetch information signals from the four operation portions 51 at the same time.

The decode portion 93 receives, through the CPU bus interface 67 and the interconnection 84, the fetch information signals supplied from the other three fetch portions 92 onto the internal bus line 75. As the result, the decode portion 93 is supplied with the fetch information signals from all of the four fetch portions 92 belonging to the four operation portions 51. The decode portion 93 refers to the received fetch information signals to decode the 32-bit-wide instruction. The decoded signal thus obtained is sent to the executing portion 90. Operation in the executing portion 90 is the same as that shown in the example in FIG. 5.

The example shown in FIG. 8 is advantageous in that the device structure is simple because the four CPUs 61 exchange undecoded fetch information signals. Further, the decode portion 93 can capture the fetch information signal in the decoding period which is a clock period least pressed for time. In this case, similarly to the example shown in FIG. 5, reduction in the transmission delays of data signals effectively contributes to improvement of the processing speed.

When the data signal fetched is the fetch portion 92 is not an instruction forming program but a data signal for operation (e.g., numerical data, logic value data, etc.), the executing portion 90 executes operation (e.g., addition, logical operation, etc.) based on the data signal for operation. At this time, it is not necessary for the decode portion 93 to decode instruction, so that the fetch information signal is intactly sent to the executing portion 90, for example.

Although the examples described above have shown systems in which only the control portions 91 share the operation processing in the CPUs 61 provided in the plurality of units 50a to 50d, it is also possible to form a device such that device parts including the executing portions 90 share operation processing. In this case, it is possible to use 8-bit type CPUs which perform processing in units of 8 bits as the CPUs 61.

At this time, for example, when adding 32-bit data signals, each executing portion 90 executes addition of 8 bits formed by equally bit-slicing the 32 bits into four. It is then necessary to exchange carry signals for addition among the executing portions 90, which requires not only the interconnections 83 and 84 for coupling the decode portions 93 but also interconnections for coupling the executing portions 90.

3. Third Preferred Embodiment

In the above-described devices according to the first and second preferred embodiments, the bit width of data signals written in and read from the memory portions 12(,14), corresponds to the bit width of data signals written in and read from the DRAMs 4(,64) built in the memory portions 12(,14).

Figure 9:
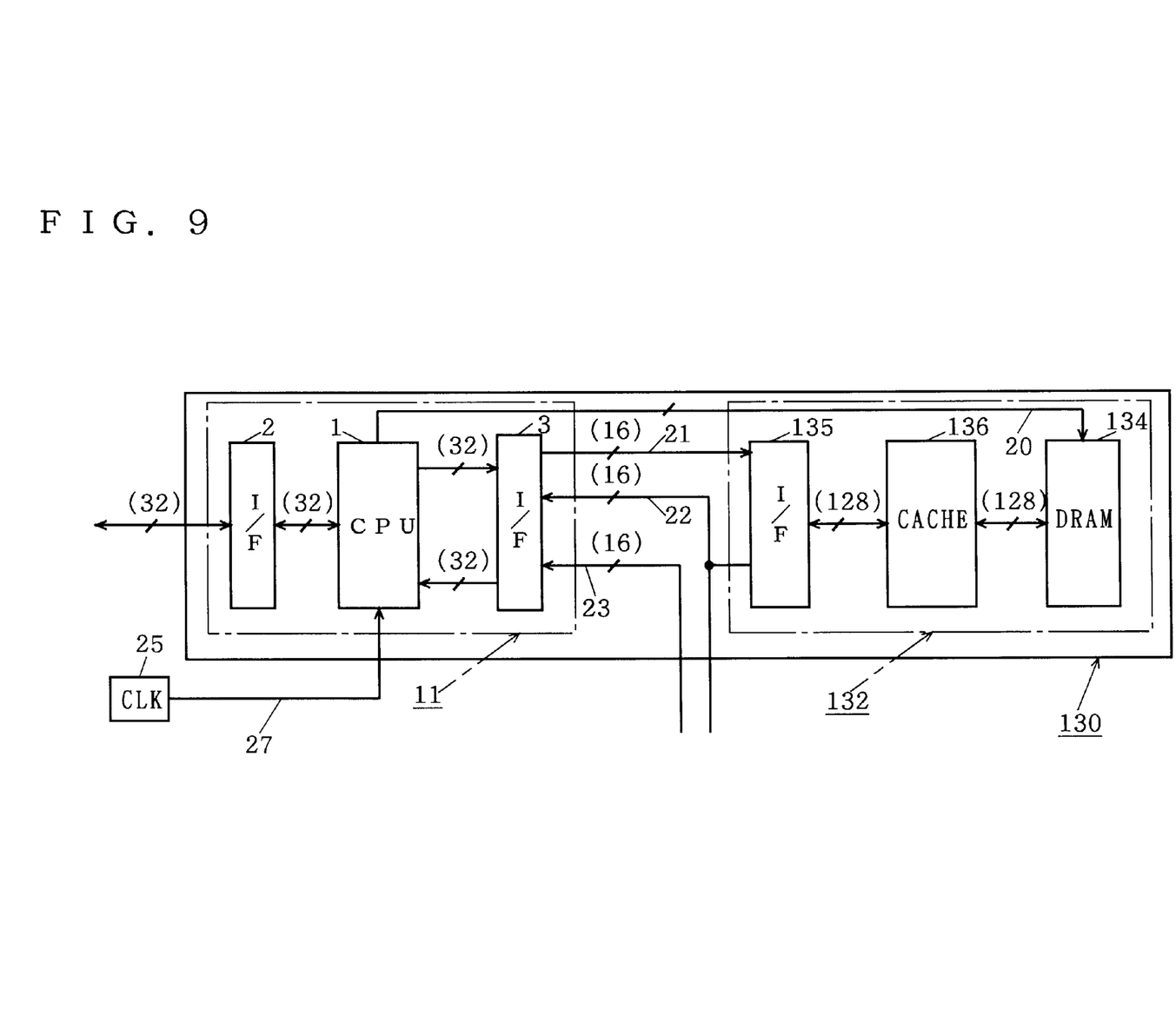
FIG. 9 is a block diagram showing a unit according to a third preferred embodiment.

For example, in the example shown in FIG. 2, the CPU bus interface 3 and the memory bus interface 5 exchange 16-bit-wide data signals and the memory bus interface 5, the cache memory 6 and the DRAM 4, also, exchange the same 16-bit-wide data signals. However, generally, the bit widths of data signals may differ. FIG. 9 is a block diagram showing an example of a unit configured in accordance with this concept.

The unit 130 shown in FIG. 9 includes a memory portion 132 as well as the operation portion 11 shown in FIG. 2. The unit 130 is formed of a single semiconductor chip, which can be connected to another unit 130 in parallel, like the units 10a and 10b shown in FIG. 2, to form a data processing device.

In the memory portion 132, unlike the DRAM 4 (FIG. 2), the memory bus interface 135, the cache memory 136 and the DRAM 134 exchange 128-bit-wide data signals. That is to say, the data signals are written in and read from the DRAM 134 in a width of 128 bits. This unit 130 can further improve the processing speed since the data signals simultaneously written in and read from the DRAM 134 has a larger number of bits than in the units 10a and 10b.

4. Fourth Preferred Embodiment

Figure 10:
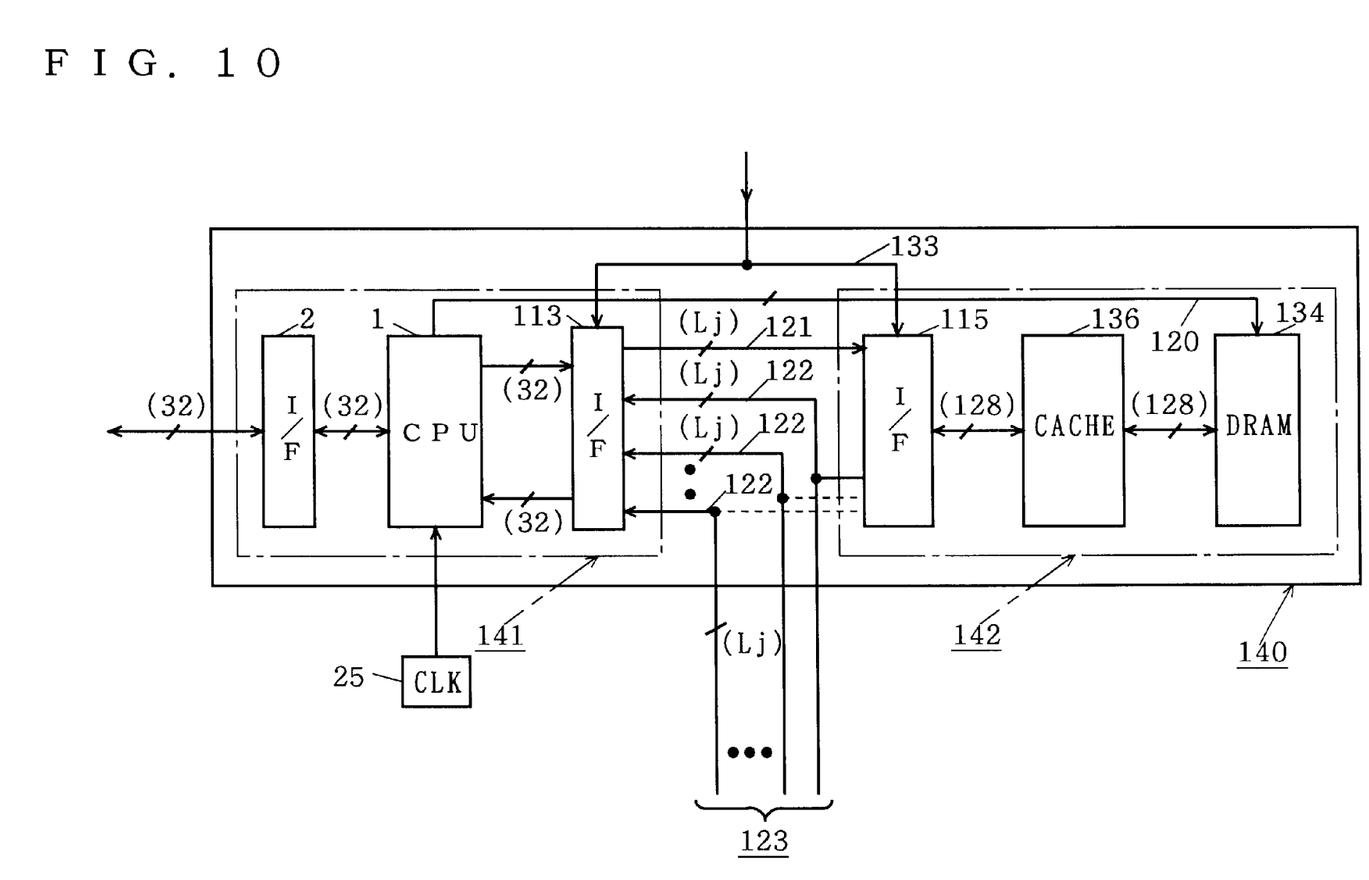
FIG. 10 is a block diagram showing a unit according to a fourth preferred embodiment.

FIG. 10 is a block diagram showing the structure of a unit according to a fourth preferred embodiment. This unit 140 includes an operation portion 141 and a memory portion 142. The unit 140 is formed of a single semiconductor chip, which can be connected to another or other unit(s) 140 in parallel to form a data processing device, similarly to the units 10a, 10b (FIG. 2) or the units 50a to 50d (FIG. 4).

This unit 140 is characteristically different from the units shown in the first to third preferred embodiments in that the bit width of data signals written in and read from the memory portion 142 is variable. The operation portion 141 includes a CPU bus interface 113 in addition to the CPU 1 and the input/output interface 2. This CPU bus interface 113 freely sets the bit width Lj of data signals read from and written in the memory portion 142 in response to a select signal inputted from outside through an interconnection 133.

The memory portion 142 includes a memory bus interface 115 as well as the DRAM 134 and the cache memory 136. This memory bus interface 115 freely sets the bit width Lj of data signals exchanged with the CPU bus interface 113 in response to the select signal. That is to say, the CPU bus interface 113 and the memory bus interface 115 set the bit width Lj in correspondence with each other in response to the select signal inputted in common.

That is to say, with the bit width Lj as a variable based on the select signal, a data signal with the bit width Lj is written from the CPU bus interface 113 into the memory bus interface 115 through the interconnection 121, and a data signal of the bit width Lj is read from the memory bus interface 115 into the CPU bus interface 113 through the interconnection 122.

Further, data signal(s) with bit width(s) Lj are inputted to the CPU bus interface 113 from the memory bus interface(s) 115 belonging to another or other unit(s) 140 through other interconnection(s) 122. The interconnections 122 for transmitting the data signals with the bit width(s) Lj belong to the bus line 123, are allocated within the bus line 123 according to the select signal.

In the example shown in FIG. 10, as the CPU 1 is 32-bit type, the bus line 123 includes 32 interconnections corresponding to the 32-bit width. When the bit width Lj is 8 bits, for example, the bus line 123 is formed of four interconnections 122 each having eight lines. The memory bus interface 115 is connected to all interconnections forming the bus line 123, in which the interconnections 122 not corresponding to the bit width Lj specified by the select signal enter a high impedance state, whose connections are interrupted as shown by the dotted lines in FIG. 10.

As well as the bus 123, the interconnection 121, also, has 32 interconnections so that it can transmit data signals with a maximum width of 32 bits. Among the interconnections, only Lj interconnections corresponding to the bit width Lj specified by the select signal are connected to the CPU bus interface 113 and the memory bus interface 115 and used for transmission of the Lj-bit-wide data signal.

Addressing to the DRAM 134 is achieved with address signals sent from the CPU 1 to the DRAM 134 through the interconnection 120, similarly to the first to third preferred embodiments. The memory portion 142 functions with respect to the operation portion 141 as if it was a DRAM having bit lines Lj bits corresponding to the bit width Lj specified with the select signal.

Figure 11:
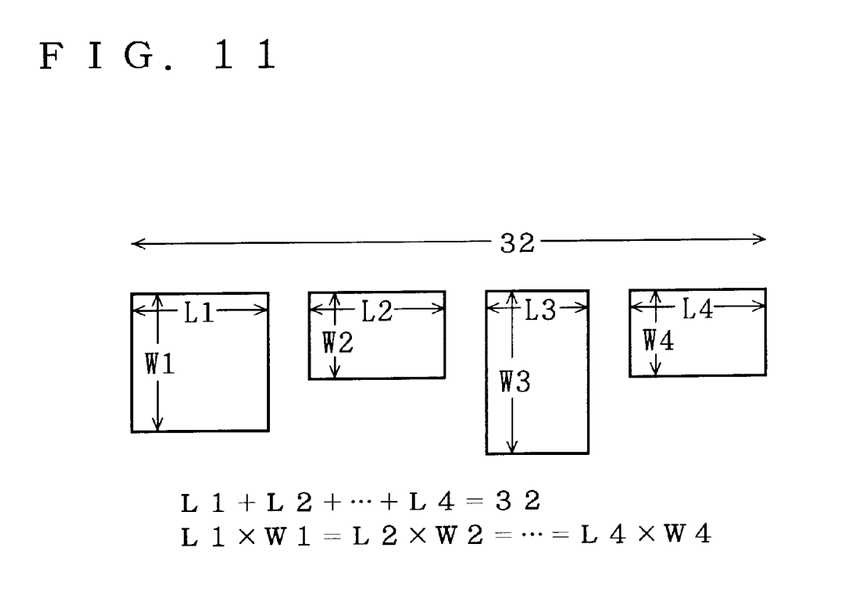
FIG. 11 is a diagram showing an example of a bit/word configuration for the device according to the fourth preferred embodiment.
Figure 12:
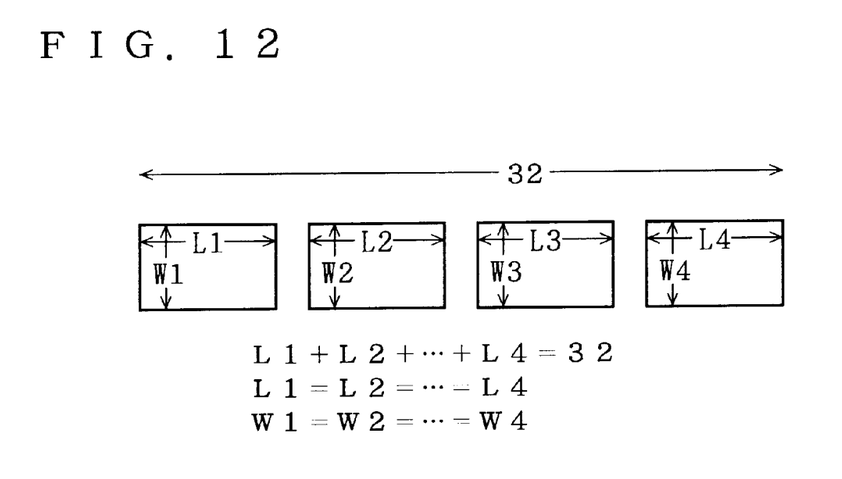
FIG. 12 is a diagram showing a more desirable example of the bit/word configuration for the device of the fourth preferred embodiment.

FIG. 11 and FIG. 12 are explanation diagrams showing bit/word configurations for the memory portion 142 in a data processing device formed by connecting four units 140 in parallel as an example. In the example shown in FIG. 11, the bit widths Lj are not the same among the four units 140. However, the sum total of the bit widths Lj (j=1 to 4) corresponds to 32, and the product of the bit width Lj and the number of word lines Wj, Lj×Wj, is common among all units 140.

In contrast, in the example shown in FIG. 12, the bit widths Lj are the same among the four units 140. The example shown in FIG. 12 is preferable to the general example shown in FIG. 11. It has the advantage of equalizing characteristics such as transmission rate of data signals among the units 140, in addition to the advantage of facilitating setting of the bit widths Lj.

5. Modifications (1) Although the above-described preferred embodiments have shown examples in which the memory portions have DRAMs, the present invention can use not only DRAMs but also other common semiconductor memories such as SRAMs (static RAMs), read-only semiconductor ROMs, etc. The effects described in the preferred embodiments can be obtained by using general semiconductor memories as well. However, DRAMs, having the highest degree of integration among general semiconductor memories, are most suitable for applications to the present invention. When semiconductor ROMs are used in FIG. 2, for example, the interconnections 21 for transmitting data signals from the operation portions 11 to the memory portions 12 are not required.

(2) Although the above-described preferred embodiments have shown examples in which operation portions have CPUs and programs defining procedures of operation processings to be executed by the CPUs are previously stored in the semiconductor memories such as DRAMs provided in the memory portions, the operation portions may generally be formed of logic circuits (e.g., combinations of logic elements). In this case, programs are not stored in the semiconductor memories, but data signals to be supplied to the logic circuits are stored in advance. In this case, the present invention provides usefulness especially when the logic circuits operate on the basis of data signals with large amounts of data, that is to say, when the memory space of the semiconductor memory has, representatively, a storage capacity of 1 megabit or larger.

While the present invention has been described in detail, the foregoing description is in all aspects illustrative and not restrictive. It is understood that numerous other modifications and variations can be devised without departing from the scope of the invention.

I claim:

1. A data processing device comprising:

m (m≧2) operation portions;

m memory portions; and an interconnection for coupling said m operation portions and said m memory portions;

wherein said m operation portions comprise m CPUs, respectively, said m memory portions comprise m semiconductor memories, respectively, said m semiconductor memories can store a sequence of data signals of N (N≧2) bit width including a program defining operation of said m CPUs, said data signals being bit-sliced into m sliced signals respectively having bit widths L1, L2, . . . , Lm (L1, L2, . . . , Lm≧1; L1+L2+ . . . +Lm=N) and said m sliced signals being respectively allocatable to said m semiconductor memories, and said m CPUs sequentially read said data signals of N bit width stored in the entirety of said m semiconductor memories and sequentially execute processings based on said data signals of N bit width, and wherein m pairs of which includes one of said m operation portions and one of said m memory portions are, respectively, formed in m single semiconductor chips which are separated from each other.

2. The data processing device according to claim 1, wherein each of said m CPUs reads said data signals of N bit width stored in the entirety of said m semiconductor memories and sequentially executes processings based on said data signals of N bit width, and as a result, said m CPUs execute same processings.

3. The data processing device according to claim 2,
wherein said m operation portions further comprise m first interfaces respectively coupled to said m CPUs,
said m memory portions further comprise m second interfaces respectively coupled to said m semiconductor memories, and
said interconnection links said m first and second interfaces to couple each of said m CPUs to all of said m semiconductor memories,
wherein said m second interfaces read said m sliced signals from said m semiconductor memories, respectively, and
each of said m first interfaces receives all of said m sliced signals which have been respectively read by said m second interfaces and reconfigures said data signals of N bit width, and then inputs said data signals of N bit width to one of said m CPUs which belongs to one of said m operation portions in common therewith,
and wherein said first and second interfaces changeably set said bit widths L1, L2, ..., Lm in response to a select signal inputted from outside.

4. The data processing device according to claim 3,
wherein each of said m semiconductor memories is readable and writable,
said m first interfaces respectively cut out m cut signals respectively having said bit widths L1, L2, ..., Lm which have been changeably set from m N-bit-wide data signals outputted from said m CPUs and respectively provide said m cut signals to said m second interfaces, and
said m second interfaces respectively write said m cut signals as said m sliced signals in said m semiconductor memories,
and wherein when said m cut signals are respectively transferred from said m first interfaces to said m semiconductor memories through said m second interfaces, each of said m cut signals is transferred within same one of said m single semiconductor chips.

5. The data processing device according to claim 1,
wherein each of said m semiconductor memories is readable and writable, and
when writing said data signals of N bit width into said m semiconductor memories, said m CPUs write said m sliced signals formed by bit-slicing of said data signals into said m semiconductor memories, respectively,
and wherein when said m sliced data signals are respectively transferred from said m CPUs to said m semiconductor memories, each of said m sliced signals is transferred within same one of said m single semiconductor chips.

6. The data processing device according to claim 5, wherein each of said m semiconductor memories is a dynamic RAM.

7. The data processing device according to claim 6,
wherein said m memory portions further comprise m cache memories respectively coupled to said m dynamic RAMs, and
the data signals are read from and written in said m dynamic RAMs through said m cache memories respectively coupled to said m dynamic RAMs.

8. The data processing device according to claim 1, wherein each of said m CPUs reads only one of said m sliced signals having a bit width Li (i is one of 1, 2, ..., m) stored in one of said m semiconductor memories which is formed in one of said m single semiconductor chips in common therewith and at least the entirety of said CPUs sequentially executes processing based on said data signals of N bit width.

9. The data processing device according to claim 8,
wherein each of said m CPUs comprises a decode portion and an executing portion,
wherein every time said decode portion decodes said one of said m sliced signals, said decode portion supplies the obtained decode information to all of other CPUs and receives decode information obtained by all of said other CPUs to complete decoding of said data signals of N bit width, and
said executing portion receives decoded results of said data signals of N bit width obtained in said decode portion as in input to execute processing based on said data signals of N bit width.

10. The data processing device according to claim 8, wherein each of said m CPUs comprises a fetch portion and an executing portion,
every time said fetch portion fetches said one of said m sliced signals, said fetch portion supplies obtained fetch information to all of other CPUs, and
said executing portion executes processing based on said data signals through said fetch information signals obtained from said fetch portion and all of said other CPUs.

11. The data processing device according to claim 1, wherein said bit widths L1, L2, ..., Lm are sized so that L1=L2= ... =Lm.

12. The data processing device according to claim 1, further comprising a clock generating portion for generating clock pulses,
wherein said clock pulse generating portion supplies said clock pulses to said m CPUs in common.

13. A data processing device comprising:
m (m≧2) operation portions;
m memory portions; and
an interconnection for coupling said m operation portions and said m memory portions;
wherein said m operation portions comprise m logic circuits, respectively, and
said m memory portions comprise m semiconductor memories, respectively,
wherein said m semiconductor memories have a storage capacity of 1 megabit or larger and can store a sequence of data signals of N (N≧2) bit width, said data signals being bit-sliced into m sliced signals respectively having bit widths L1, L2, ..., Lm (L1, L2, ..., Lm≧1; L1+L2+ ... +Lm+N) and said m sliced signals being respectively allocatable to said m semiconductor memories, and
said m logic circuits are sequentially supplied with said data signals of N bit width stored in the entirety of said m semiconductor memories and sequentially execute processings based on said data signals of N bit width,
and wherein m pairs each of which includes one of said m operation portions and one of said m memory portions are, respectively, formed in a separate single semiconductor chips which are separated from each other.

* * * * *